United States Patent
Black

(10) Patent No.: US 6,198,294 B1
(45) Date of Patent: Mar. 6, 2001

(54) IN-SITU BACKGRIND WAFER THICKNESS MONITOR

(75) Inventor: Andrew J. Black, San Antonio, TX (US)

(73) Assignee: VLSI Technology, Inc., San Jose, CA (US)

(*) Notice: Subject to any disclaimer, the term of this patent is extended or adjusted under 35 U.S.C. 154(b) by 0 days.

(21) Appl. No.: 09/312,776

(22) Filed: May 17, 1999

(51) Int. Cl.[7] .................................................. G01R 27/26
(52) U.S. Cl. .......................................... 324/671; 324/663
(58) Field of Search ...................................... 324/663, 671

(56) References Cited

U.S. PATENT DOCUMENTS

| | | | |
|---|---|---|---|
| 4,860,229 | * | 8/1989 | Abbe et al. ........................ 324/671 X |
| 4,910,453 | * | 3/1990 | Abbe et al. ........................ 324/663 |
| 5,081,421 | * | 1/1992 | Miller et al. ........................ 324/671 |
| 5,337,015 | * | 8/1994 | Lustig et al. ........................ 324/671 |

\* cited by examiner

*Primary Examiner*—Glenn W. Brown
(74) *Attorney, Agent, or Firm*—Douglas L. Weller

(57) ABSTRACT

Thickness of a wafer is monitored during grinding. A conductive plate is located below the wafer during grinding. One or more capacitive sensors are located above the wafer during grinding. A monitoring device monitors capacitance of the conductive plate and the capacitive sensor.

8 Claims, 3 Drawing Sheets

IN-SITU BACKGRIND WAFER THICKNESS MONITOR

BACKGROUND

The present invention concerns processing of integrated circuits and pertains particularly to in-situ monitoring of wafer thickness during backgrinding.

Before dividing silicon wafers into dies and packaging the resulting integrated circuits, it is often necessary to grind the back of a wafer until the wafer is a predetermined thickness. Such wafer backgrind processes control grind thickness using a feedback loop where wafer thickness is measured at the center of the product wafer. The center wafer measurement is used for feedback. Test wafers or product wafers are used to monitor thickness and thickness range of the grind process. Test wafers are used to initially verify the thickness range of the grind process after maintenance, a change in grind thickness or other change in the grind process. The feedback uses the thickness of an already ground product wafer to provide feedback during grinding a new product wafer. However, there are several deficiencies in this system.

For example, it is impossible to monitor uniformity on product wafers without taking ex-situ (i.e., not during actual performance of grinding) measurements on a previously ground batch of product wafers. Generally, such monitoring requires a separate metrology tool and thickness measurement step. Also, a separate measurement stage on the grinder itself is required for checking the thickness of the wafer. Using this methodology, a certain lack of uniformity in wafer thickness can result. The lack of uniformity in wafer thickness can result in wafer bow and stress. Further, lack of grind uniformity can result in stresses in silicon and thin films placed on the wafer surface. These stresses can lead to cracks and voids in the silicon substrate. Also hillocks and film peeling can occur on the device side of the wafer if stresses in the wafer are not kept in check. Further, sometimes wafers break when grinder setup is not done properly. Additionally, the above-described methodology introduces a significant time lag between the actual grinding and the detecting of a lack of uniformity or improper thickness in a batch of wafers.

SUMMARY OF THE INVENTION

In accordance with the preferred embodiment of the present invention thickness of a wafer is monitored during grinding. A conductive plate is located below the wafer during grinding. One or more capacitive sensors are located above the wafer during grinding. A monitoring device monitors capacitance of the conductive plate and the capacitive sensor.

For example, the conductive plate is embedded within a chuck onto which the wafer is placed during grinding. The capacitive sensors are mounted within a rod suspended over the wafer during grinding.

The present invention allows a user to monitor the grind process with real-time measurements and precisely define material removal and thus, process endpoint. In the preferred embodiment, capacitance is measured in several locations across the radius of the rotating wafer. The wafer is treated as a dielectric in this capacitive system. As the wafer thins capacitance decreases. The grind process is stopped automatically when the desired capacitance and corresponding wafer thickness is reached. The result is a repeatable endpoint and consistent post-grind thickness & uniformity, increased yield, and lower cost of ownership through improved tool efficiency and lower test wafer usage. The present invention also provides a diagnostic tool for users to monitor tool function over time.

The invention provides many advantages over prior art systems. For example, the present invention allows grind rate and wafer thickness to be monitored during polish. This allows technicians to quickly react to uniformity and thickness issues. The present invention makes possible grinding to a thickness endpoint since the capacitance at the final thickness can be taught. Also, wafer thickness uniformity can be monitored at the same time. Improved uniformity reduces wafer bow and stress.

Further, using the present invention, die yield and reliability are improved through better wafer thickness control in several ways. First, the control of grind uniformity reduces the stresses in the silicon and thin films on the wafer surface. These stresses can lead to cracks and voids in the silicon substrate. Also hillocks and film peeling can occur on the device side of the wafer if stresses in the wafer are not kept in check. Second, the die assembly yield increases when die thickness is controlled more tightly. This is important as packaging sizes continue to shrink. Third, process yield for the backgrind area is increased since many wafer break situations are related to grinder setup issues. The symptoms of these problems can be caught immediately with in-situ monitoring as provided by the present invention.

Further, the present invention allows for reduced production costs by increasing grind throughput. Throughput is increased because grinding is done only as long as needed. Also the incident angle of the grind wheel can be optimized and monitored for the most efficient grinding. The present invention allows thickness and uniformity to be monitored on product wafer. This eliminates the need for a separate metrology tool and thickness measurement step for monitoring grind performance. Also the separate measurement stage on the grinder itself that is used for checking the thickness of the wafer can be removed. The result is a smaller grinder footprint in backgrinders designed in accordance with the present invention. Another cost reduction is from reduction of test wafer usage for qualification. With the present invention, the need to use test wafers to monitor thickness and thickness range for the grind process is significantly reduced. For example, test wafers now need only be used for verifying operation after preventative maintenance or after another significant change in the tool set-up. Other uses of a test wafer are replaced by the capacitance monitoring of wafers.

Finally, the present invention allows a user to troubleshoot grinder performance. Data can be saved and logged for each wafer pass to provide both a history of each lot run and trend data for tool performance. For example, a wafer that breaks during grind would give a noisy signal easily recognized by the user.

DESCRIPTION OF THE PREFERRED EMBODIMENT

Figure 1:
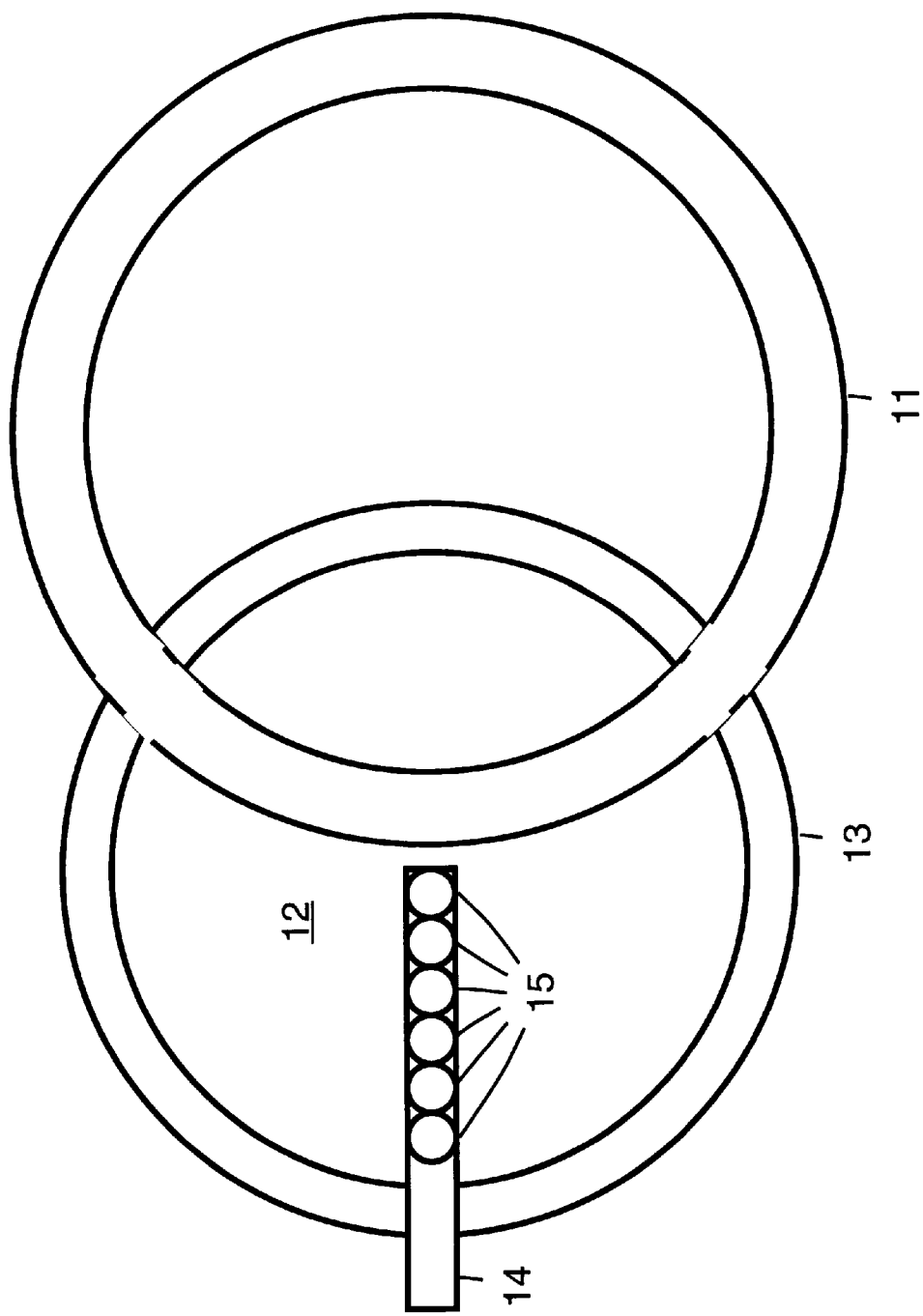
FIG. 1 is a simplified top view of a system that monitors in-situ grind thickness of a wafer in accordance with a preferred embodiment of the present invention.

FIG. 1 is a simplified top view of a system that monitors in-situ grind thickness of a wafer 12. Wafer 12 is placed face-down on a chuck 13. A grind wheel 11 is used to grind the back of wafer 12 to a predetermined thickness. Grinder wheel 11 is, for example, similar to the grinder wheel used on a Model 7AA grinder available from Strasbaugh, Inc., having a business address of 2924 Kettering Drive, Saint Charles, Mo. 63303-5420 314-928-2266. Capacitive sensors 15, mounted on a rod 14, are used to monitor thickness of wafer 12. Capacitive sensors 15 are composed of, for example, aluminum or some other conductive material. Rod 14 is composed of a material with significantly less capacitance than capacitive sensors 15. For example, rod 14 is composed of Polyetheretherketone (PEEK). Capacitive sensors 15 are mounted as close to wafer 12 as possible without rod 14 or capacitive sensors 15 actually coming into physical contact with wafer 12 or with any grind byproducts. Capacitor sensors 15 are not in electrical contact with one another.

Figure 2:
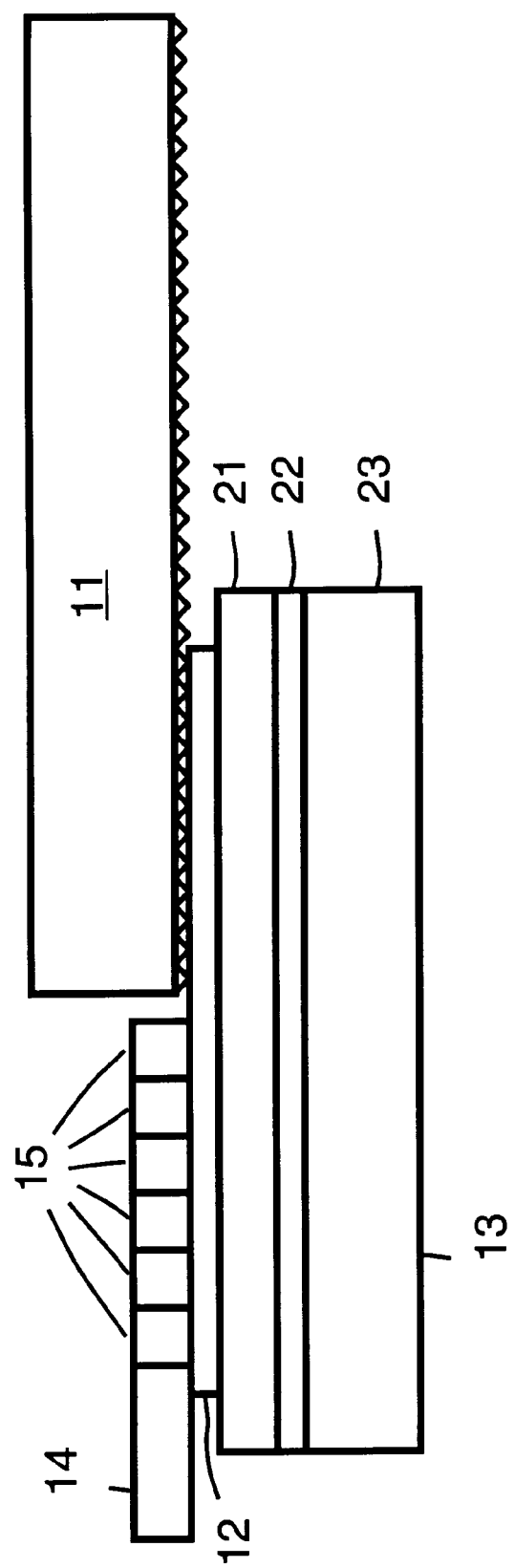
FIG. 2 is a side view of the system shown in FIG. 1 in accordance with a preferred embodiment of the present invention.

As shown in FIG. 2, within chuck 13, sandwiched between a porous ceramic layer 21 and a porous ceramic layer 23, is an embedded conductive plate 22. Embedded conductive plate 22 is composed of, for example, aluminum or another conductive material. Thickness of conductive plate 22 is not critical. A typical thickness for conductive plate 22 is one centimeter. An in-situ grind thickness capacitance measurement is used to detect wafer thickness changes during grinding or polishing. A user is enabled to monitor the grind process with real-time measurements and precisely define material removal and thus, process endpoint. Capacitance of capacitive sensors 15 and embedded conductive plate 22 is continuously measured in order to monitor thickness of wafer 12. Placement of capacitive sensors 15 on rod 14 allows capacitance to be measured in several locations across the radius of wafer 12 as wafer 12 is being rotated by chuck 13. Wafer 12 is treated as a dielectric between embedded conductive plate 22 and capacitive sensors 15. As wafer 12 thins, capacitance decreases. The grind process is stopped automatically when the desired capacitance and thus corresponding wafer thickness is reached. The result is a repeatable endpoint and consistent post-grind thickness and uniformity, increased yield, and lower cost of ownership through improved tool efficiency and lower test wafer usage. This system also can be used to provide a diagnostic tool for users to monitor tool function over time.

As the thickness of wafer 12 decreases, the effective dielectric constant decreases, as illustrated by Equation 1 below:

$$C = \kappa C_0 \quad \text{Equation 1}$$

In equation 1, C represents capacitance of conductive plate 22 and capacitive sensors 15 during grinding and $C_0$ represents the capacitance of conductive plate 22 and capacitive sensors 15 when wafer 12 is not present. The constant $\kappa$ is the effective dielectric constant with wafer 12 in place. The dielectric constant of air is close to 1 while the dielectric constant of silicon is much higher. As more silicon is ground away, silicon is replaced by air decreasing the dielectric constant. The result is a decrease in capacitance. The capacitance is monitored allowing thickness of wafer 12 to be monitored during grinding. The thickness can be monitored during the entire grind process or just during the fine grind portion of the process. Typically, wafer 12 is approximately 700 micrometers thick before performing the grinding process. During a typical grinding process, 200 to 450 micrometers is removed from wafer 12 leaving wafer 12 with an after grind thickness of between 250 and 500 micrometers.

Figure 3:
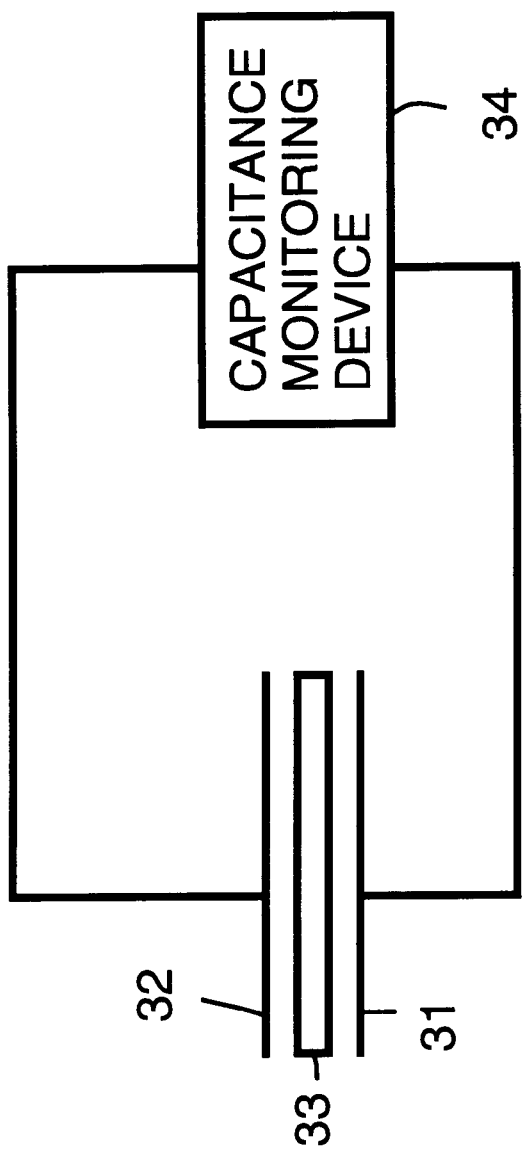
FIG. 3 is a simplified schematic illustrating electrical operation of the system that monitors in-situ grind thickness of the wafer shown in FIG. 1 in accordance with a preferred embodiment of the present invention.

FIG. 3 is a simplified schematic that illustrates electrical operation of the system that monitors in-situ grind thickness of wafer 12. A top capacitor electrode 32 represents one or more of capacitive sensors 15. A bottom capacitor electrode 31 represents conductive plate 22. Dielectric material 33 represents wafer 12 and the portion of chuck 13 immediately below wafer 12. A capacitance monitoring device monitors capacitance of top capacitor electrode 32 and bottom capacitor electrode 31. Capacitance monitoring device 34 includes, for example, a computing system in communication with a QProx sensor manufactured by Quantum Research Group, Ltd., and available from Electronic Engineering Associates having a business address of 932 Terminal Way, San Carlos, Calif. 94070-3225. By running trial wafers, a user is able to measure voltage changes and thereby determine the resulting capacitance of a wafer having a desired thickness. Subsequent wafers may then be ground with the resulting voltage value and calculated capacitance indicating a grinding endpoint has been reached.

The foregoing discussion discloses and describes merely exemplary methods and embodiments of the present invention. As will be understood by those familiar with the art, the invention may be embodied in other specific forms without departing from the spirit or essential characteristics thereof. For example, the conductive plate may be on top of the chuck rather than embedded within it. Alternatively the chuck itself could be a conductive plate. Accordingly, the disclosure of the present invention is intended to be illustrative, but not limiting of the scope of the invention, which is set forth in the following claims.

I claim:

1. A system for monitoring thickness of a wafer during grinding, the system comprising;
    a conductive plate located below the wafer during grinding;
    a capacitive sensor located above the wafer during grinding; and,
    a monitoring device which monitors capacitance of the conductive plate and the capacitive sensor, wherein the conductive plate and the capacitive sensor act as electrodes of a capacitor of which capacitance is monitored.

2. A system as in claim 1 wherein the conductive plate is embedded within a chuck onto which the wafer is placed during grinding.

3. A system as in claim 1 wherein the capacitive sensor is one of a plurality of capacitive sensors mounted over the wafer during grinding, the capacitive sensors allowing capacitance to be measured in several locations across a radius of the wafer.

4. A system as in claim 1 wherein the capacitive sensor is mounted within a rod suspended over the wafer during grinding.

5. A method for monitoring thickness of a wafer during grinding, the method comprising the following steps;
    (a) locating a conductive plate below the wafer during grinding;
    (b) locating a capacitive sensor above the wafer during grinding; and,
    (c) monitoring capacitance of the conductive plate and the capacitive sensor, wherein the conductive plate and the capacitive sensor act as electrodes of a capacitor of which capacitance is monitored.

6. A method as in claim 5 wherein step (a) includes embedding the conductive plate within a chuck onto which the wafer is placed during grinding.

7. A method as in claim 5 wherein in step (b) the capacitive sensor is mounted with a plurality of capacitive sensors, so as to allow capacitance to be measured in several locations across a radius of the wafer.

8. A method as in claim 5 wherein in step (b) the capacitive sensor is mounted within a rod suspended over the wafer during grinding.

* * * * *